(12) United States Patent
Greiner et al.

(10) Patent No.: US 10,654,391 B2
(45) Date of Patent: May 19, 2020

(54) VEHICLE WITH A CARGO BED

(71) Applicant: Greiner Schaltanlagen GmbH, Kerzenheim (DE)

(72) Inventors: Hans-Joachim Greiner, Kerzenheim (DE); Harald Schmidt, Lautersheim (DE)

(73) Assignee: Greiner Schaltanlagen GmbH, Kerzenheim (DE)

( * ) Notice: Subject to any disclaimer, the term of this patent is extended or adjusted under 35 U.S.C. 154(b) by 0 days.

(21) Appl. No.: 15/978,225

(22) Filed: May 14, 2018

(65) Prior Publication Data
US 2018/0326885 A1 Nov. 15, 2018

(30) Foreign Application Priority Data
May 12, 2017 (DE) .................... 20 2017 102 873 U

(51) Int. Cl.
| | | |
|---|---|---|
| *B60P 1/00* | (2006.01) | |
| *B60P 7/08* | (2006.01) | |
| *B62D 33/02* | (2006.01) | |
| *B60P 7/13* | (2006.01) | |
| *B60P 1/64* | (2006.01) | |
| *B60P 3/025* | (2006.01) | |

(52) U.S. Cl.
CPC ............... *B60P 1/00* (2013.01); *B60P 1/6427* (2013.01); *B60P 7/08* (2013.01); *B60P 7/0815* (2013.01); *B60P 7/13* (2013.01); *B62D 33/02* (2013.01); *B60P 3/025* (2013.01)

(58) Field of Classification Search
CPC .................................. B60P 1/6427; B60P 7/13
See application file for complete search history.

(56) References Cited

U.S. PATENT DOCUMENTS

| | | | | | |
|---|---|---|---|---|---|
| 1,303,854 | A | * | 5/1919 | Clark .................... | B60P 1/6427 248/352 |
| 1,425,965 | A | * | 8/1922 | Hocke .................. | B65G 63/065 296/35.3 |
| 2,849,129 | A | * | 8/1958 | Likens ..................... | B60P 1/36 414/339 |
| 2,981,210 | A | * | 4/1961 | Krueger ................ | B60P 1/6427 105/215.1 |
| 3,362,552 | A | * | 1/1968 | Thiele ................... | B60P 1/6427 414/469 |
| 3,841,511 | A | * | 10/1974 | Haun .................... | B60P 1/6427 414/499 |

(Continued)

*Primary Examiner* — Jonathan Snelting
(74) *Attorney, Agent, or Firm* — Smartpat PLC

(57) ABSTRACT

A vehicle with a cargo bed comprises an adapter element arranged in a movable manner along the cargo bed. A support element for at least one functional element is detachably fixed on the adapter element. A guide system for the adapter element comprises at least two parallel guide rails. The adapter element comprises at least two guide elements which engage in the guide rails. At least one guide rail comprises a retaining bead laterally projecting into a guide groove of the guide rail. At least one guide element fixed to the adapter element engages behind the retaining bead, such that a lifting of the adapter element is prevented by the guide rail. The adapter element comprises at least one braking device, which can be brought into operative connection with the cargo bed in order to prevent a displacement of the adapter element on the cargo bed.

11 Claims, 4 Drawing Sheets

(56) References Cited

U.S. PATENT DOCUMENTS

| | | | | |
|---|---|---|---|---|
| 4,339,148 A | * | 7/1982 | Smith | B62D 21/186 |
| | | | | 105/363 |
| 4,409,903 A | * | 10/1983 | Wilhelmsson | B60P 1/6427 |
| | | | | 104/162 |
| 4,580,805 A | * | 4/1986 | Bertolini | B62D 53/067 |
| | | | | 280/149.2 |
| 4,836,735 A | * | 6/1989 | Dennehy, Jr. | B60P 1/6427 |
| | | | | 280/149.2 |
| 5,417,540 A | * | 5/1995 | Cox | B60P 1/6427 |
| | | | | 414/495 |
| 9,162,654 B2 | * | 10/2015 | Moller | B60K 1/04 |
| 9,238,429 B2 | * | 1/2016 | Bluhm | F16D 63/008 |

* cited by examiner

VEHICLE WITH A CARGO BED

TECHNICAL FIELD

The present invention relates to a vehicle with a cargo bed.

BACKGROUND

Vehicles with cargo beds, on which a variety of goods can be transported, are known from the prior art. With commercial vehicles used by tradespeople, it is possible to transport on the cargo bed the products, along with implements or accessories, needed for carrying out manual work on site. The implements and accessories may be tools or machines that are often stowed in suitable containers during transport and are needed to carry out manual work and are brought down from the cargo bed. In particular, during transport, tools or accessories with a greater weight are preferably stored far in front of the cargo bed, directly behind the driver's cab. This makes it difficult to access the tools and machines required while performing work on-site.

However, it is also the case that party guests can be served from the cargo bed of a vehicle, such as a pick-up truck or an off-road vehicle. For example, the dispensing of beverages from the cargo bed of a pick-up truck or off-road vehicle is possible. In this case, and in other activities such as the provision of food or the playback of music from the cargo bed, it is often necessary to move the required functional elements on the cargo bed. For example, it may be desirable to position a coffee machine on an edge of the cargo bed, where it is easily accessible to party guests. Since there is usually not much space available on cargo beds, it is quite laborious to reposition functional elements on the cargo bed. If a functional element (such as a coffee machine) is no longer needed on the cargo bed, it should be possible to easily remove the functional element from the cargo bed.

As such, the present invention is based on the object of providing a vehicle with a cargo bed on which a functional element can be easily moved, in order to reposition it. It should also be possible to remove the functional element from the cargo bed in a simple manner.

SUMMARY

The object is accomplished by a vehicle having a cargo bed, whereas, according to the invention, the vehicle is designed such that, on the cargo bed, an adapter element is arranged in a movable manner along the cargo bed, and whereas a support element for at least one functional element is detachably fixed on the adapter element. The functional element can be moved to different positions on the cargo bed by moving the adapter element with the support element fixed thereto over the cargo bed. If the functional element is to be removed from the cargo bed, the support element can be detached from the adapter element and the functional element can be taken down from the cargo bed together with the support element.

Different support elements can also be fixed alternately on the adapter element, in order to enable different uses of the vehicle. For example, a first support element may comprise functional elements for an outdoor kitchen or leisure activities, while a second support element is equipped with functional elements, such as tools and equipment for a mobile workshop. The individual functional elements can be fixed either permanently or with suitable fastening elements on the respective support element, and do not have to be elaborately removed and installed if the particular utilization character of the vehicle is changed.

For example, a tradesperson can either arrange the required tools and machines directly in a suitably designed support element, or accommodate them in separate containers, which are then arranged in a box-like or cage-like support element. Prior to the start of driving, the support element equipped with tools and machines can be placed on the adapter element on the cargo bed, and connected to it. The adapter element is expediently located on a rear loading edge of the cargo bed, which is freely accessible from outside the vehicle. Subsequently, the adapter element with the support element arranged thereon can travel over the cargo bed, and can be fixed to an end of the cargo bed turned towards the driver's cab. Thereby, while driving the vehicle, a favorable arrangement of the center of gravity of the loaded vehicle is made possible, by which the driving characteristics of the loaded vehicle can be improved.

The vehicle may be any vehicle, preferably a motor vehicle. The vehicle may be a pick-up truck or an off-road vehicle with an open cargo bed. However, it is also possible that the vehicle is a van or a small transporter, the cargo bed of which is completely enclosed. A cargo bed equipped according to the invention with a displaceable adapter element and a support element can also be used in a truck with an open or closed cargo space.

In particular, with a commercial use, a functional element may be industrial goods and tools, machinery or other work equipment. According to the invention, the functional element may also be a beverage dispenser, a grill, a cooling container, a heating element, a sound system, a lighting system or another functional element. The functional element according to the invention may be connected to the support element either in a fixed or detachable manner.

Preferably, the adapter element is arranged in a movable manner along a cargo bed between a rear edge of the cargo bed extending along a rear end of the vehicle and a boundary surface of the cargo bed, which is arranged opposite the rear edge. Thus, for example, a functional element formed as a beverage dispenser can be moved to the rear edge of the cargo bed, where drinks for party guests can be tapped and handed out. For this purpose, the adapter element is moved to the rear edge of the cargo bed along the cargo bed. After use, the adapter element, together with the functional element, can be moved to the boundary surface opposite the rear edge of the cargo bed. There, the functional element is closer to the center of gravity of the vehicle, which is advantageous if the vehicle is in motion.

Alternatively or additionally, the adapter element is arranged in a movable manner between a first side edge and a second side edge of the cargo bed along the cargo bed, whereas the first side edge and the second side edge are aligned essentially parallel to a direction of travel of the vehicle. This makes it possible to move the functional element located on the support element from the first side edge of the vehicle to the second side edge of the vehicle.

It is advantageous if a gap between the adapter element and the support element is adjustable, such that a gap between the cargo bed and the functional element can be changed. It may be desirable to adjust the height of the functional element precisely to the intended use. So that the gap between the adapter element and the support element can be adjusted accordingly, the adapter element and the support element according to the invention can be connected to each other via telescopic rods, a rail system, a scissors mechanism or any other connection mechanism. The connection mechanism preferably enables the fixing of a gap between the adapter element and the support element.

It is preferred if the cargo bed comprises a rail system on which the adapter element is arranged in a movable manner. The rail system may consist of one or more rail elements. According to the invention, the rail elements may be formed such that the adapter element can be moved along a straight and/or a curved track. According to the invention, the rail system may be a plurality of rails that extend in different directions and that are connected to each other. According to the invention, it is possible for the rail system to provide a profiled rail guide for guiding the adapter element. Alternatively, the provision of a telescopic rail guide or another rail guide is possible. According to the invention, the adapter element can be formed such that it comprises balls or rollers that are placed on the rail.

According to a preferred embodiment of the invention, the adapter element is connected to the rail system in such a manner it cannot be removed from the rail system by a force that is directed essentially perpendicular to the cargo bed. This embodiment is advantageous since, in this case, the adapter element, and thus also the support element and any functional element provided thereon, cannot detach from the cargo bed if the vehicle is in motion.

According to a particularly advantageous design of the inventive concept, it is provided that the guide system comprises at least two guide rails extending parallel to each other, and that the adapter element comprises at least two guide elements that engage in the guide rails, such that, upon a displacement of the adapter element, the guide elements are guided along the guide rails. Through the guide elements, which are arranged or formed on the adapter element, a positive-locking engagement of the adapter element is effected with the guide rails and ensures the reliable guidance of the adapter element along the guide rails. The at least two guide elements can engage in the same guide rail. In terms of a reliable and mechanically resilient guide, it is advantageous that at least two guide elements engage in each of at least two guide rails. The adapter element may comprise, for example, a rectangular base area and comprise a guide element in each corner, whereas two guide elements arranged along one side edge in the two assigned corners engage in a guide rail in the cargo bed assigned to the relevant side edge. In the case of an expected high mechanical load of the support element by heavy functional elements, three or more guide rails arranged parallel to one another may also be arranged on the cargo bed, and the adapter element may comprise a number and arrangement of a plurality of guide elements adjusted thereto.

In order to enable additional cargo securing, it is optionally provided that at least one guide rail comprises a retaining bead laterally projecting into a guide groove of the guide rail, and that at least one guide element fixed to the adapter element engages behind the retaining bead, such that a lifting of the adapter element is prevented by the guide rail. The guide rail may have a suitable profile, with which a profile leg bounding the guide groove on the side comprises a molding that projects inwardly and forms the retaining bead. The guide element may comprise a molding that is adjusted thereto and engages behind the retaining bead.

It is also possible that the guide element comprises a guide roller arranged in the guide groove, which is rotatably mounted around an axis of rotation, which is aligned in a manner perpendicular to the cargo bed. Upon a displacement of the adapter element, the guide roller rolls off along the guide rails on a side wall bounding the guide groove or on a profile leg bounding the guide groove on the side, as the case may be, and thereby reduces the resistance generated during a displacement of the adapter element through the engagement of the guide element in the guide groove.

In order to additionally facilitate the displacement of the adapter element on the cargo bed, independent of the design of the adapter element, it is possible in principle for the adapter element to comprise displacement rollers arranged on a bottom side of the adapter element, such that the adapter element can roll back and forth on the cargo bed with the displacement rollers. The displacement direction is determined by the rail system, or advantageously by the guide rails, as the case may be.

According to a particularly advantageous design of the inventive concept, it is provided that the adapter element comprises at least one braking device, which can be brought into operative connection with the cargo bed in order to prevent a displacement of the adapter element on the cargo bed. The braking device may comprise, for example, a friction surface made of a soft or rubberized material, which can be pressed against the cargo bed in order to impede or prevent the displacement of the adapter element. The braking device may also comprise a brake engagement element that is displaceable and projects in the direction of the cargo bed, for example, a brake hook or a brake nose, which can engage in the brake engaging recesses that are adjusted to it and are arranged along a displacement direction, if the brake engagement element is displaced in the direction of the cargo bed. To release the braking effect, the friction surface or the brake engagement element only has to be displaced away from the cargo bed.

With regard to a braking effect that is particularly easy to operate, it is optionally provided that the braking device comprises a brake pad, which is pressed against a top side of the cargo bed by spring actuation and can be lifted off the cargo bed by a brake release device. The brake pad is expediently made of a suitable rough or deformable material, or comprises a corresponding coating, such that, upon pressing the brake pad against the cargo bed, a high frictional force and thus a large braking effect is generated. The brake pad is pressed against the cargo bed by spring actuation, such that, without an actuation of the brake release device, the adapter element is fixed on the cargo bed in its current position. To displace the adapter element, the brake release device must be actuated, which can be effected, for example, by pressing or pivoting a brake release lever, by which the brake pad is lifted off the cargo bed and the adapter element can be displaced without braking.

In order to, during travel with the vehicle, be able to fix the adapter element, and thus also the support element arranged on the adapter element, with the functional elements arranged therein or thereon in a predetermined transport position with a particular degree of reliability, according to the invention, it is optionally provided that the adapter element comprises a displaceable pawl, which, in a transport position of the adapter element, engages behind a retaining lug arranged on the cargo bed and fixes the adapter element in the transport position. The pawl may be a component of the brake pad or the braking element. It is also possible to form or arrange a separate pawl on the bottom side of the adapter element. The pawl expediently comprises an inclined sliding surface, such that, upon a displacement into the intended transport position, the pawl slides away over the retaining lug arranged on the cargo bed and, with a blocking surface arranged adjacent to the inclined sliding surface, enters into a positive-locking engagement with the retaining lug. In order to displace the adapter element out of the transport position that is locked in such a manner, the pawl must be raised or pivoted or displaced in order to release the engagement with the retaining lug and to be able to displace the adapter element beyond the retaining lug.

It is particularly preferred if the guide system comprises at least one gear rack. The adapter element according to the invention may comprise a gear wheel that engages in the rack. If the gear wheel is rotated, the adapter element moves through the gear rack guided along the gear rack.

According to the invention, the adapter element may be formed as a frame or as a box. The frame or the box may be made of a metal or a plastic. However, according to the invention, other materials for producing the frame or the box are also possible. According to the invention, the adapter element may also comprise any other geometric design.

The support element is preferably formed as a plate or as a box. According to the invention, the support element may be made of metal, plastic, wood or any other material. If the support element is a box, it may be formed to be open at the top. According to the invention, the box may comprise a pivotable door in at least one side wall. The door may be pivoted such that a functional element contained in the box becomes accessible from one side of the box.

The support element according to the invention may be a fastening device, which enable the attachment of a functional element or a plurality of functional elements to the support element. Preferably, the fastening device enables one or more functional elements to be detachably fastened to the support element. The fastening device may be a belt or a Velcro strip. However, according to the invention, functional elements can also be screwed to the support element, glued to it, or fastened to the support element in other ways. The support element according to the invention may be made corrosion-resistant and/or heat-resistant.

According to an advantageous embodiment of the invention, a manually operable drive mechanism is provided on the vehicle; which is configured to transmit a force exerted on the manually operable drive mechanism on the adapter element, such that the adapter element is moved along the cargo bed. This has the advantage that the adapter element, the support element or the functional element does not have to be acted upon directly by a force in order to move the functional element over the cargo bed. Thus, a user does not necessarily have to stand on the cargo bed to move the functional element. Instead, the functional element can be affected, for example, by actuating an operating element on one side of the cargo bed or in a driver's cab of the vehicle.

According to a possible embodiment of the invention, the manually operable drive mechanism comprises a crank element and a cable element, whereas the cable element is fastened to the adapter element. This is a structure that enables the exertion of a force on the adapter element in a simple manner by means of a rotational movement, such that the adapter element is moved along the cargo bed. According to further embodiments of the invention, it is possible that the cable element is fastened to the plate element or the functional element.

It is advantageous if a motor-driven drive mechanism is provided on the vehicle, which enables the movement of the adapter element along the cargo bed by means of motor force. According to the invention, the motor-driven drive mechanism can be triggered by the actuation of an operating element that is arranged on the cargo bed, on one side of the cargo bed or in a driver's cab of the vehicle. The operating element may be formed to trigger the motor-driven drive mechanism via radio. Possible embodiments of the invention allow the control of the motor-driven drive mechanism via a WIFI network or via a Bluetooth connection, such that control via a mobile phone and/or a tablet computer is possible. The motor-driven drive mechanism preferably comprises an electric motor. According to the invention, however, the use of an internal combustion engine is also possible in order to set the adapter element in motion.

Preferably, the motor-driven drive mechanism is arranged in or on the adapter element. According to the invention, it is possible that the adapter element comprises a drive mechanism, which includes at least one electric motor. According to the invention, it is further possible that the drive mechanism additionally comprises a force transmission element (such as a gear wheel), a power supply element (such as a switching power supply) or a transformer power supply, an energy storage device (such as a battery) and/or a control element (such as a microcontroller).

It is advantageous if the adapter element comprises a fixing element for fixing the adapter element at a position on the cargo bed. As a result, the adapter element can be fixed at a position on the cargo bed. This is particularly advantageous if the adapter element is to be fixed in a transport position while the vehicle is in motion. The fixing element may be formed as a braking element, which affects a fixing of the adapter element by the braking element pressing against the cargo bed or against a section of the rail system. The fixing element can also be formed as a bolt, as a screw or as another element, which can engage in a recess of the cargo bed or of the rail system.

Preferably, the support element comprises at least one release element, which is configured such that a connection between the support element and the adapter element is released if the at least one release element is actuated. According to the invention, the release element may be designed as a switch that can be flipped to release the support element from the adapter element.

It is advantageous if the support element comprises at least one grip element, on which the support element can be grasped. By means of the grip element, the support element can be lifted and transported. The grip element may be a strap-like element attached to the support plate. Alternatively, the grip element may be a recess in a surface of the support element, in which it can be grasped. It is particularly advantageous if the grip element additionally comprises the functionality of a release element. Thus, according to the invention it is possible that a grip element is designed to be pivotable. If the pivotable grip element is flipped to lift the support element, the support element is released from the adapter element.

BRIEF DESCRIPTION OF THE DRAWINGS

Additional advantageous embodiments of the invention are shown in the drawings.

DETAILED DESCRIPTION

Figure 1:
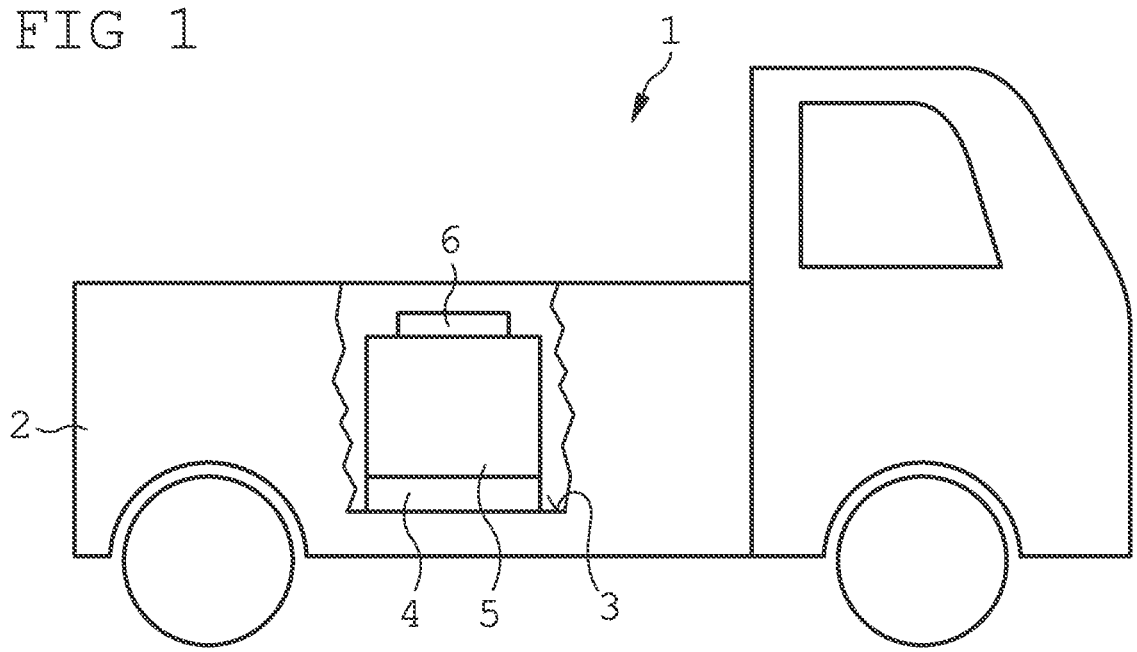
FIG. 1 shows a vehicle according to the invention in a side view.

FIG. 1 shows the vehicle 1 according to the invention in a side view. A side wall 2 of a cargo bed 3 of the vehicle 1 is shown in partially cut form, such that an adapter element 4 arranged on the cargo bed 3 is visible. The adapter element 4 is detachably connected to a support element 5 mounted on it. The support element 5 has a box shape and is open at the top. A functional element 6, which in the present case is a coffee machine, is arranged in the support element 5. The adapter element 4 is movable along the cargo bed 3, such that the support element 5 and the functional element 6 can thus be moved over the cargo bed 3.

Figure 2:
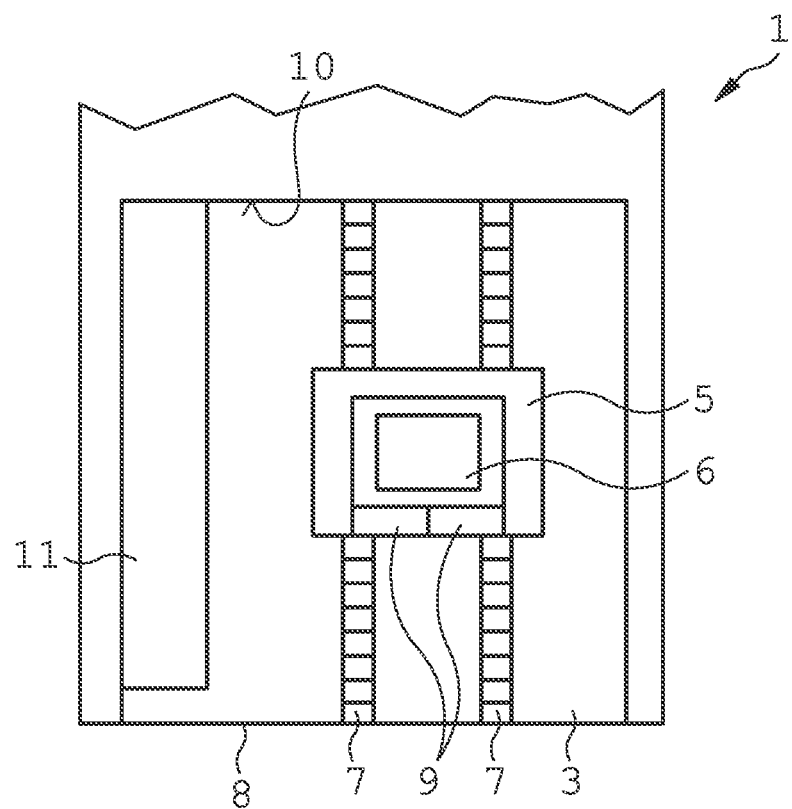
FIG. 2 shows a cargo bed of the vehicle according to FIG. 1 in a view from above.

FIG. 2 shows the cargo bed 3 of the vehicle 1 according to FIG. 1 in a view from above. Two gear racks 7 are arranged on the cargo bed 3; such gear racks are provided for guiding the adapter element, not shown in FIG. 2, along the cargo bed 3. The adapter element comprises a non-visible motor-driven drive mechanism with gear wheels that can engage in the gear racks 7. A rotational movement of the gear wheels causes a movement of the adapter element along the gear racks 7. The adapter element can be moved to a rear edge 8 of the cargo bed 3. As a result, the support element 5 and the functional element 6 are also moved over the cargo bed 3. Two door elements 9 of the support element 5 can be opened, such that the functional element 6 is accessible to persons standing in front of the rear edge 8 of the vehicle. If the vehicle 1 is to be converted for transport, the adapter element can be moved to a boundary surface 10 of the cargo bed 3. Here, it is located closer to the center of gravity of the vehicle 1 and on the cargo bed 8, storage space is made available in the area of the rear edge. A control element 11 is also arranged on the cargo bed 3. The control element 11 includes a battery that provides power for the operation of the functional element 6 and the motor-driven drive mechanism. Furthermore, the control element 11 includes control electronics for controlling the motor-driven drive mechanism.

Figure 3:
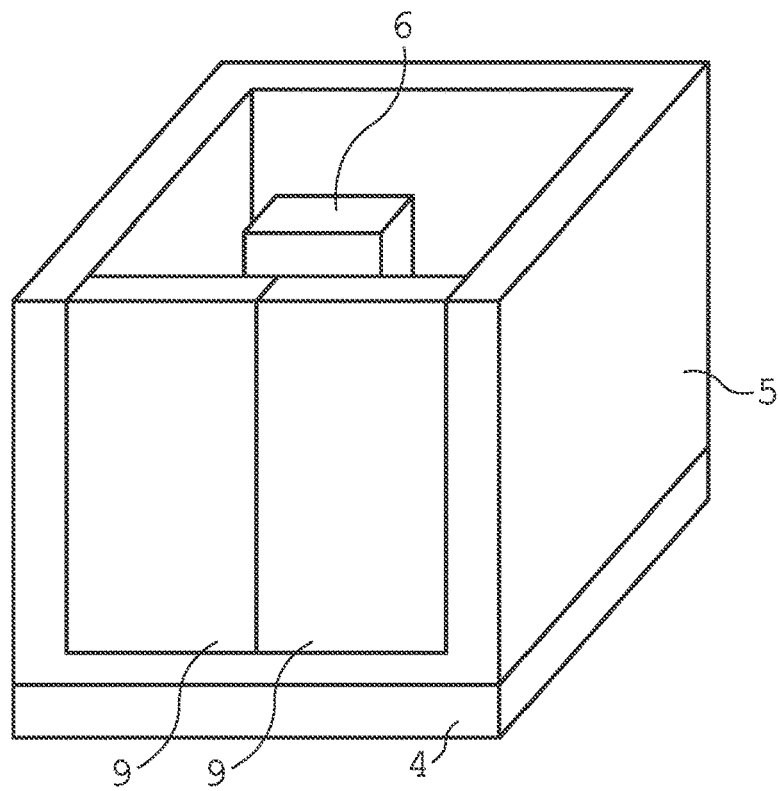
FIG. 3 shows an adapter element and a support element of the vehicle according to FIGS. 1 and 2 in a perspective view.

FIG. 3 shows the adapter element 4 and the support element 5 of the vehicle 1 according to FIGS. 1 and 2 in a perspective view. The support element 5 is detachably connected to the adapter element 4. The functional element 6 is arranged in the support element 5. The support element 5 comprises two door elements 9. These can be pivoted such that the functional element 6 is accessible from the side of the support element 5.

Figure 4:
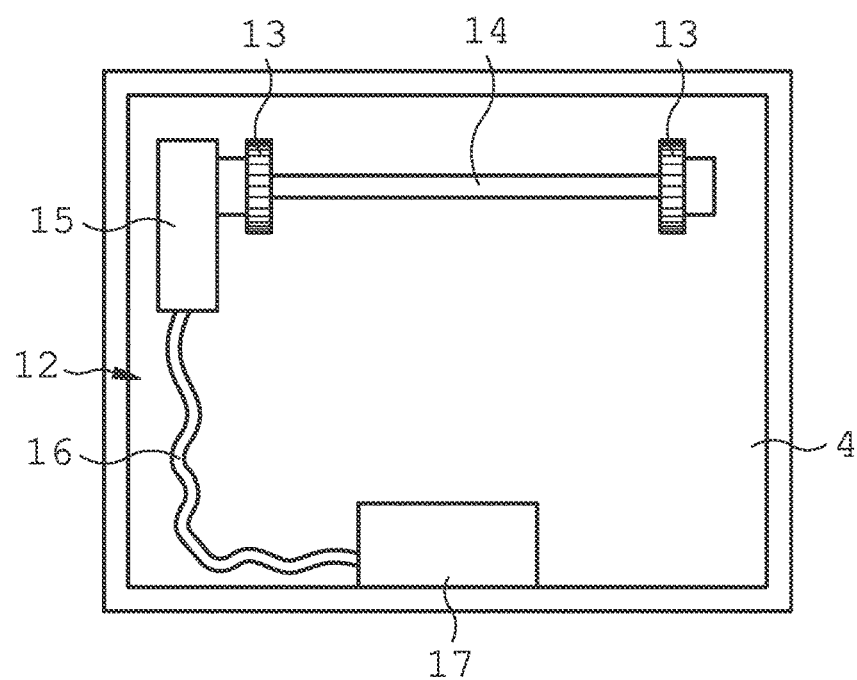
FIG. 4 shows the adapter element of the vehicle according to FIGS. 1 to 3 in a view from below.
Figure 5:
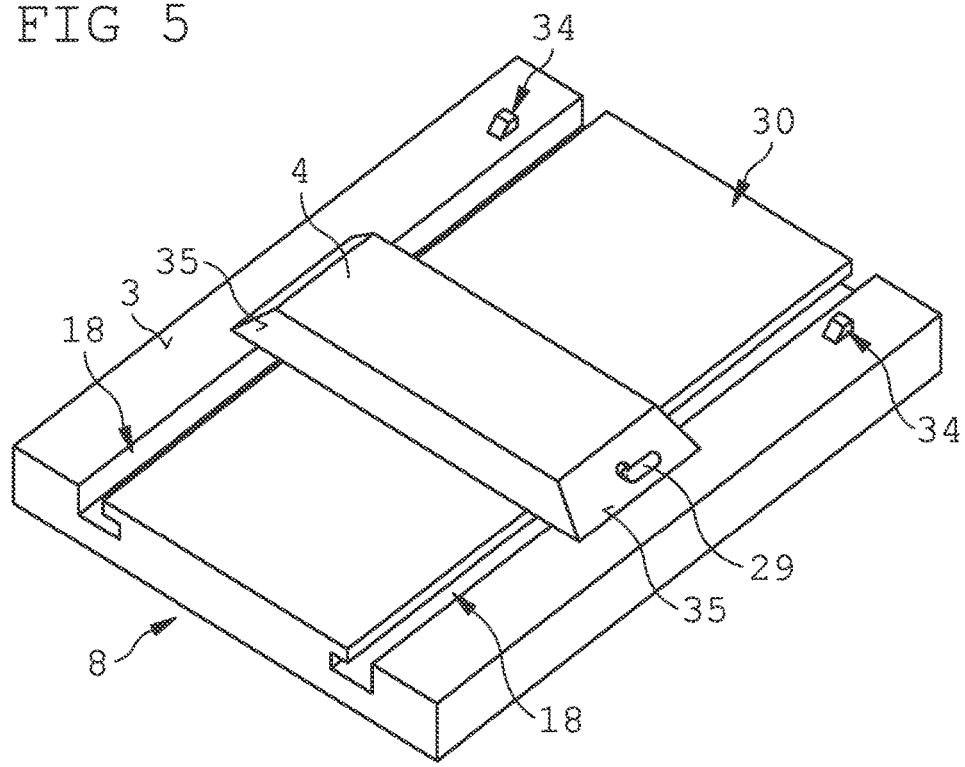
FIG. 5 is a perspective view of a differently configured adapter element on a cargo bed with two guide rails.
Figure 6:
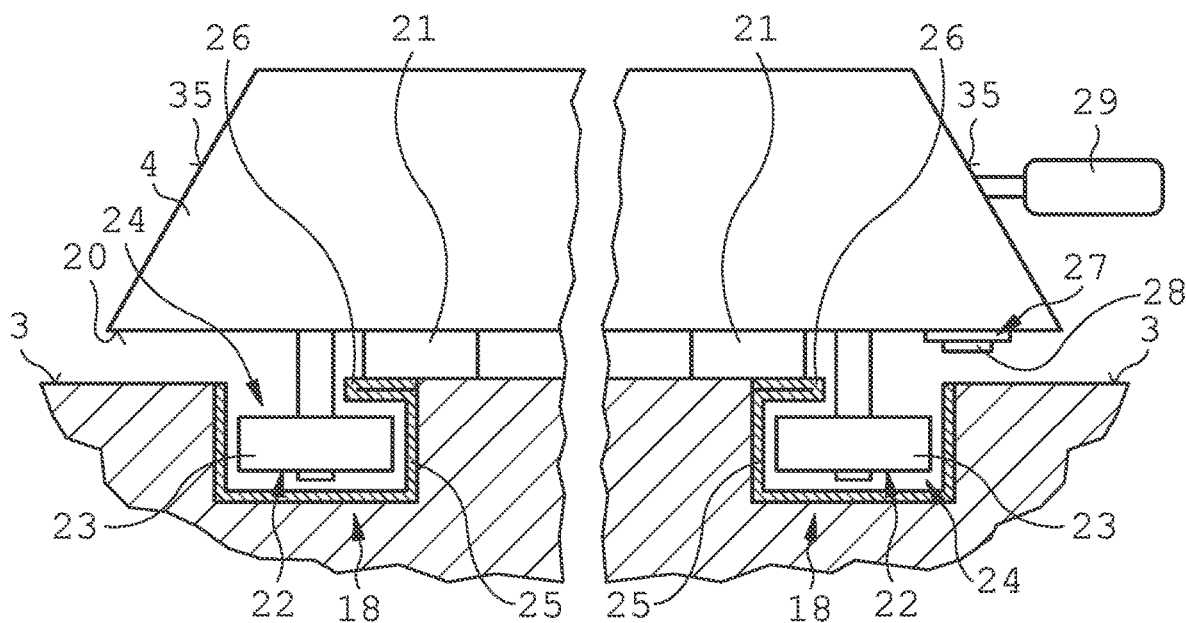
FIG. 6 is a top view of a rear edge of the cargo bed, whereas the guide rails and guide elements of the adapter element engaging in the guide rails are visible.
Figure 7:
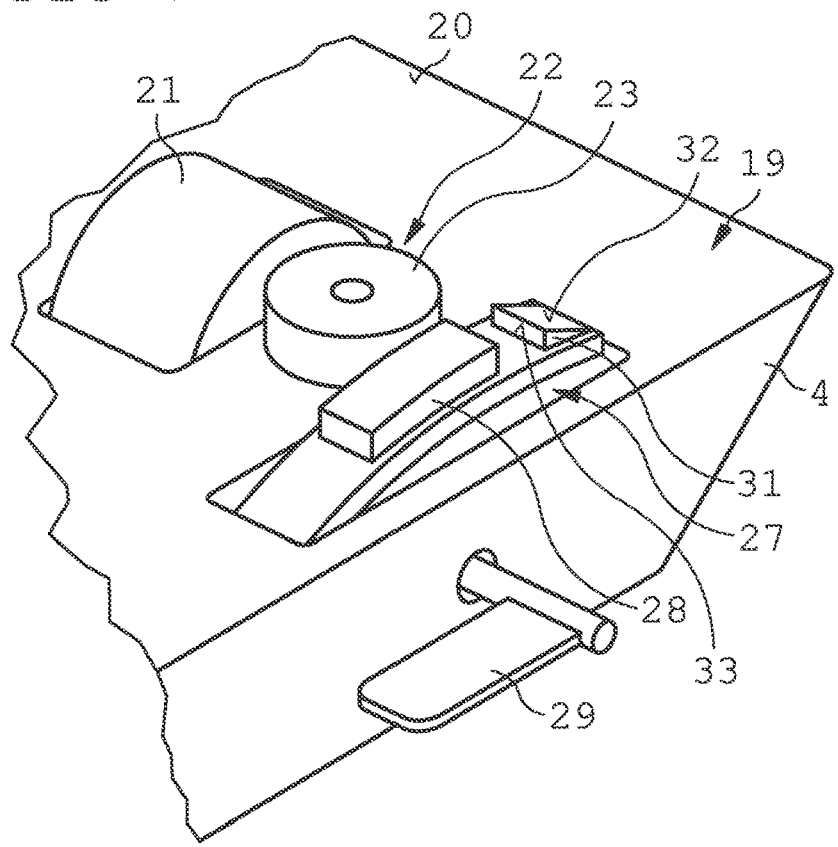
FIG. 7 is a view of an bottom side of a corner area of the adapter element.

FIG. 4 shows the adapter element 4 of the vehicle 1 according to FIGS. 1 to 3 in a view from below. The motor-driven drive mechanism 12 of the adapter element 4 comprises two gear wheels 13, which are suited to engage in the previously described gear racks. The gear wheels 13 are connected to each other via a shaft 14. The motor-driven drive mechanism 12 comprises an electric motor 15, which is directly connected to one of the gear wheels 13. The electric motor 15 is configured to set the gear wheels 13 in a rotational movement, by which the adapter element 4 is moved along the gear racks. The electric motor 15 is connected to a supply element 17 via a cable 16. The supply element 17 is connected to an external power source, and can thus provide energy for both the electric motor 15 and for the functional element, not shown in FIG. 4, that is arranged on the support element 5.

FIGS. 5 to 8 show a differently configured adapter element 4, which is guided on two guide rails 18 extending over the cargo bed 3. The adapter element 4 comprises, in each corner area 19 of the adapter element 4, a displacement roller 21 on the bottom side 20, such that the adapter element 4 is supported by four displacement rollers 21 on the cargo bed 3, rotatably mounted in a corner area 19 of the adapter element 4 around a horizontal axis, and can be rolled back and forth along the guide rails 18 on the cargo bed 3 without greater force.

The adapter element 4 also comprises a guide element 22 in each corner area 19. In the exemplary embodiment shown, the guide element 22 is a guide roller 23 rotatably mounted around a vertical axis. Each guide roller 23 engages in a guide groove 24 of the assigned guide rail 18. Each guide rail 18 comprises, on a side wall 25, a retaining bead 26 laterally projecting into the guide groove 24. The guide roller 23 arranged in the guide groove 24 engages behind the retaining bead 26, by which it is impossible to lift the adapter element 4 upwards. The guide rollers 23 guided in the guide grooves 24 of the guide rails 18 form a forced guidance for the adapter element 4.

With the exemplary embodiment shown, a braking device 27 is shown in a corner area 19. The braking device 27 comprises a brake pad 28, which is pressed by a spring device (not shown) in the direction of the cargo bed 3. With a brake release lever 29, the brake pad 28 can be displaced away from the cargo bed 3, and the adapter element 4 can be rolled back and forth on the cargo bed 3 without braking. If the brake release lever 29 is not actuated, the spring device presses the brake pad 28 onto the cargo bed 3, and prevents an unintentional displacement of the adapter element 4 on the cargo bed 3.

In order to, during travel with the vehicle, reliably fix and lock the adapter element 4 in an end area 30 opposite the rear edge 8 of the cargo bed 3, a pawl 31 is arranged on the braking device 27 behind the brake pad 28. The pawl 31 comprises an inclined sliding surface 32 and a blocking surface 33 directed perpendicular to the cargo bed 3. On the cargo bed 3, a retaining lug 34 is arranged next to each guide rail 18. Upon a displacement of the adapter element 4 in the end area 30 of the cargo bed 3, the pawl 31 slides with the sliding surface 32 by means of the retaining lug 34, until the locking surface 33 engages with the retaining lug 34 and the adapter element 4 is locked in the end area 30 through a positive-locking engagement of the pawls 31 with the retaining lugs 34. In order to once again be able to roll the adapter element 4 out of the end area 30, the brake release lever 29 must be actuated and the pawl 31 must be displaced away from the retaining lug 34.

Figure 8:
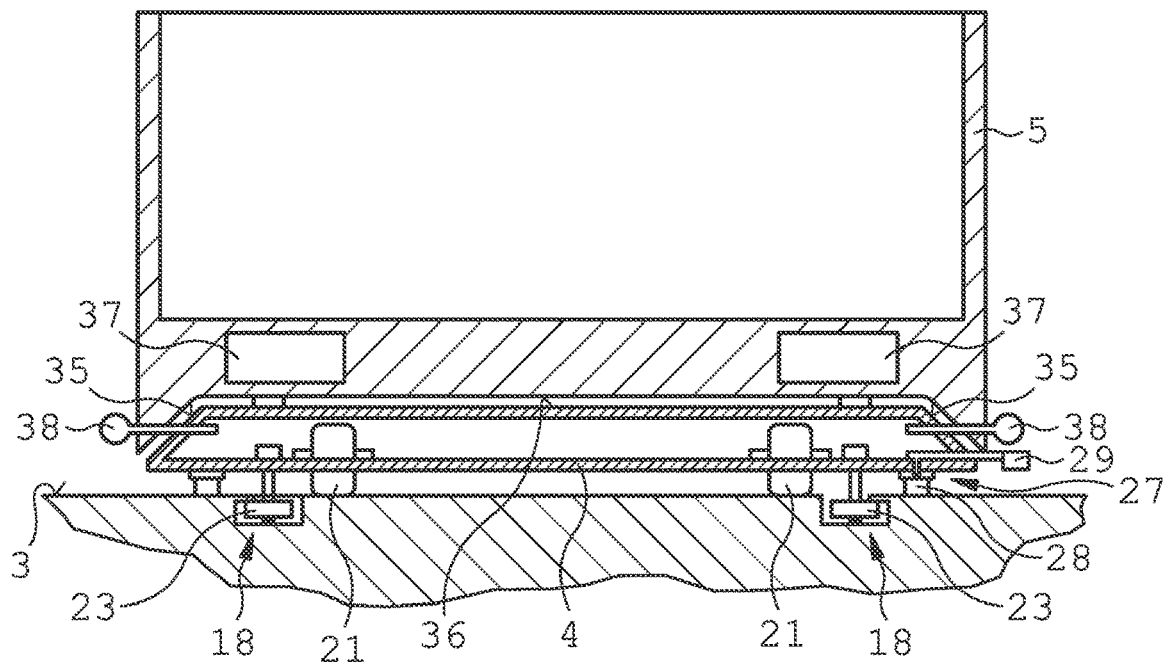
FIG. 8 is a sectional view through an adapter element arranged on a cargo bed, on which a support element is fixed.

In FIG. 8, by way of example, a support element 5 is shown; this is placed on the adapter element 4. Through inclined side edges 35 of the adapter element 4 and a bottom side 36 of the support element 5 adjusted to it, the support element 5 can be set down on the adapter element 4 in a self-centering manner. In order to take the support element 5, optionally equipped with heavy functional elements 6, to the cargo bed 3 and the adapter element 4 or withdraw the support element from it, and lift it off of the cargo bed 3, the support element 5 comprises two cavities 37 extending in a longitudinal direction parallel to the guide rails 18, into which the tines of a forklift or a lift truck can be introduced in order to transport the support element 5 to and from the cargo bed 3, and set it down on the adapter element 4, or lift it off of it. The support element 5 can be reliably fixed and latched on the adapter element 4 with spring-loaded latching rods 38, which engage laterally in the adapter element 4.

LIST OF REFERENCE SIGNS

1. Vehicle
2. Side wall

3. Cargo bed
4. Adapter element
5. Support element
6. Functional element
7. Gear racks
8. Rear edge
9. Door element
10. Boundary surface
11. Control element
12. Motor-driven drive mechanism
13. Gear wheel
14. Shaft
15. Electric motor
16. Cable
17. Supply element
18. Guide rails
19. Corner areas
20. Bottom side
21. Displacement rollers
22. Guide elements
23. Guide rollers
24. Guide groove
25. Side wall
26. Retaining bead
27. Braking device
28. Brake pad
29. Brake release lever
30. End area
31. Pawl
32. Sliding surface
33. Blocking surface
34. Retaining lug
35. Side edges
36. Bottom side
37. Cavities
38. Latching rods

The invention claimed is:

1. A vehicle with a cargo bed, comprising:
   an adapter element arranged on and movable along the cargo bed;
   a braking device comprising a brake pad configured to generate a friction force between the adapter element and the cargo bed and secure the adapter element on the cargo bed;
   a displaceable pawl, which, in a transport position of the adapter element, engages behind a retaining lug arranged on and extending upwardly from the cargo bed and secures the adapter element in the transport position by positive-locking engagement; and
   a support element for at least one functional element detachably fixed on the adapter element,
   wherein the displaceable pawl and the brake pad are arranged on a common pivoting arm.

2. The vehicle according to claim 1, wherein the adapter element is arranged in a movable manner along the cargo bed between a rear edge of the cargo bed extending along a rear end of the vehicle and a boundary surface of the cargo bed, which is arranged opposite the rear edge.

3. The vehicle according to claim 1,
   wherein the adapter element is arranged in a movable manner between a first side edge and a second side edge of the cargo bed along the cargo bed, and
   wherein the first side edge and the second side edge are aligned essentially parallel to a direction of travel of the vehicle.

4. The vehicle according to claim 1, wherein the cargo bed comprises a guide system on which the adapter element is arranged in a movable manner.

5. The vehicle according to claim 4,
   wherein the guide system comprises at least two guide rails extending parallel to each other, and
   wherein the adapter element comprises at least two guide elements that engage in the guide rails, such that, upon a displacement of the adapter element, the guide elements are guided along the guide rails.

6. The vehicle according to claim 5,
   wherein at least one guide rail comprises a retaining bead laterally projecting into a guide groove of the guide rail, and
   wherein, during a displacement of the adapter element, at least one guide element which is fixed to the adapter element engages behind the retaining bead, whereby a lifting of the adapter element is prevented by the guide rail.

7. The vehicle according to claim 1, wherein the brake pad is pressed against a top side of the cargo bed by spring actuation and can be lifted off the cargo bed by a brake release device.

8. The vehicle according to one claim 1, wherein the adapter element is formed as a frame or as a box.

9. The vehicle according to claim 1, wherein the support element is formed as a plate or as a box.

10. The vehicle according to claim 1, wherein the support element comprises at least one release element, which is configured such that a connection between the support element and the adapter element is released if the at least one release element is actuated.

11. The vehicle according to claim 1, wherein the support element comprises at least one grip element, on which the support element can be grasped.

* * * * *